United States Patent [19]

Zielinski

[11] 4,065,042

[45] Dec. 27, 1977

[54] WEB TRANSPORTING APPARATUS

[75] Inventor: Erich Zielinski, Bergen, N.Y.

[73] Assignee: Eastman Kodak Company, Rochester, N.Y.

[21] Appl. No.: 770,952

[22] Filed: Feb. 22, 1977

[51] Int. Cl.[2] .................................................. G03B 1/56

[52] U.S. Cl. ....................................... 226/92; 226/170; 354/321

[58] Field of Search ............................ 226/91, 92, 170; 352/235; 354/320, 321, 322

[56] References Cited

U.S. PATENT DOCUMENTS

| | | | |
|---|---|---|---|
| 2,878,924 | 3/1959 | Dye | 354/321 X |
| 3,462,054 | 8/1969 | Foor | 226/91 |

*Primary Examiner*—Richard A. Schacher

*Attorney, Agent, or Firm*—R. A. Fields

[57] ABSTRACT

A coupling bar, to which a leading portion of a web has been secured, is engageable with a moving belt for transporting the web. To attach the coupling bar to the moving belt, gripper members of the coupling bar are positioned to straddle a reduced width section of the moving belt. The gripper members are spaced apart a distance greater than the width of the reduced section, but less than the width of a belt section which follows the reduced section. Accordingly, after the reduced width section of the moving belt is advanced from between the gripper members, the following wider section will be moved into edgewise engagement with them. By this means, the coupling bar is attached to the moving belt without the belt having to be stopped or manipulated.

9 Claims, 5 Drawing Figures

WEB TRANSPORTING APPARATUS

BACKGROUND OF THE INVENTION

1. Field of the Invention

The present invention relates generally to apparatus for transporting individual or continuous sheets of web material, and more particularly to apparatus for transporting a web by pulling its leading end portion. While the invention has various types of applications, one particular application of the invention is to machines for processing a photosensitive web of film or print paper by drawing the web through successive developing, fixing, washing and other web-treating sections in the processor.

2. Description of the Prior Art

In photofinishing operations, it is common to move continuous or individual sheets of photosensitive web material, such as film or print paper, through a number of baths and drying sections in a processor. If this is to be done efficiently, it is necessary that a quick method of threading the web through the processor be available. Known devices have used an endless belt which is trained around a plurality of rollers, often in a sinuous path, to transport the web through the various processing sections. Typically, a leading portion of the web is secured to the transport belt at an entrance end of the processor to initiate feed-through of the entire web. Attachment of the web to the transport belt can be accomplished with a coupling bar such as disclosed in U.S. Pat. No. 2,878,924, granted Mar. 24, 1959. In operation, the leading portion of the web is first secured to the coupling bar. This may be done, for example, by passing the leading portion through a slot in one end of the bar and winding the leading portion several times around the bar to prevent their separation, as disclosed in U.S. Pat. No. 3,810,568, granted May 14, 1974. Then, an opposite end of the coupling bar is attached to the transport belt. This generally is accomplished by pinching a longitudinal section of the belt across its width to make the belt section narrow enough to fit between oppositely spaced gripper members of the coupling bar. When the belt is released between the gripper members (which are spaced apart a distance slightly less than the belt width) the belt section strives to return to its normally flat condition; whereupon, the respective longitudinal edges of the belt are frictionally held by the gripper members to attach the coupling bar to the transport belt.

Once the coupling bar is attached to the transport belt, movement of the belt around the rollers draws the web through the processor from its entrance end. At an exit end of the processor, the coupling bar is removed from the transport belt and the leading portion of the web is wound onto a take-up spool.

While the method taught by the prior art of pinching the belt across its width to connect the belt and the coupling bar may be successfully employed, it will be observed that this method suffers from several disadvantages. For example, an operator must stop the belt to transversely pinch it or else experience some difficulty in handling the moving belt, especially when it has been wetted by the processing solutions. Moreover, the plastic material commonly used in construction the belt may become less flexible in time, further making it difficult to manually pinch the belt across its width for insertion between the gripper members of the coupling bar.

Alternatively, mechanical means may be used to transversely pinch the moving belt. For example, as disclosed in U.S. Pat. No. 3,713,649, granted Jan. 30, 1973, a beltwarping block, through which successive sections of a moving belt are continuously advanced, bows the belt sections across their respective widths to make them fit between the gripper members of a coupling bar. However, while such mechanical means may be used, it tends to impede movement of the belt and may possibly wear the belt down or tear it.

SUMMARY OF THE INVENTION

These and other problems are solved, in accordance with the present invention, by a transport belt and coupling bar arrangement that enables the coupling bar to be attached to the moving belt without the belt having to be stopped or manipulated.

In a preferred embodiment of the present invention, the transport belt has at least one reduced width section which is narrower across its width than the remainder of the belt. To attach the coupling bar to the moving belt, a pair of gripper members of the coupling bar are positioned to straddle a reduced width section of the moving belt. According to the preferred embodiment, the gripper members are spaced apart a distance greater than the width of the reduced width section. This allows the reduced width section to be received between the gripper members without transversely flexing or otherwise manipulating the reduced section. Besides being greater than the width of the reduced section, the distance between the gripper members is slightly less than the width of a belt section which follows the reduced section. Consequently, after the reduced width section of the moving belt is advanced from between the gripper members, the wider belt section which follows is moved into edgewise engagement with the gripper members. In this way, the coupling bar is attached to the moving belt without the belt having to be stopped or manipulated.

According to another feature of the preferred embodiment, the reduced width section of the transport belt is tapered such that its longitudinal edges are inclined toward each other in the direction the belt is moving. This enables the longitudinal edges of the reduced width section to guide the gripper members of the coupling bar into respective engagement with longitudinal edge portions of a wider belt section which follows the reduced section.

BRIEF DESCRIPTION OF THE DRAWINGS

For a more complete understanding of the present invention, as well as the advantages and features thereof, reference should be had to the following detailed description of the invention taken in conjunction with the accompanying drawings, in which.

DESCRIPTION OF THE PREFERRED EMBODIMENT

Figure 1:
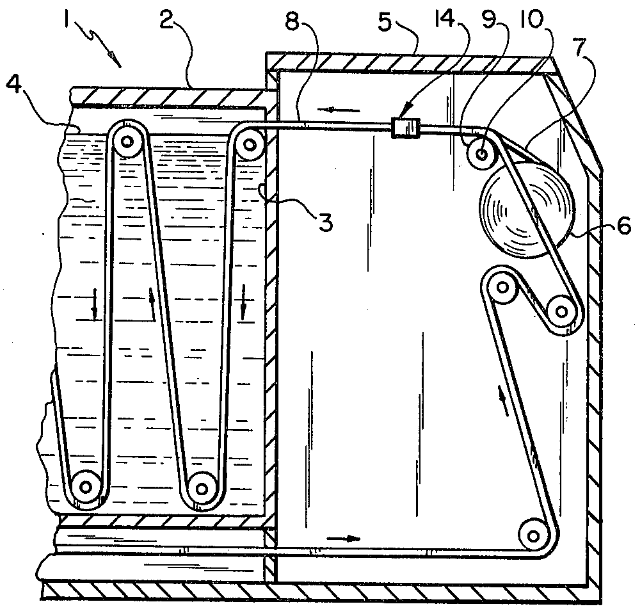
FIG. 1 is a vertical sectional view of a portion of a photographic processor, equipped with apparatus for transporting a photosensitive web according to a preferred embodiment of the present invention.

Referring now to the drawings and first to FIG. 1, there is shown a portion of a photographic processor for development and other treatment of a photosensitive web such as film or print paper. The processor, which is generally indicated by the reference number 1, has a light-tight housing 2 containing several tanks 3 (only one shown). The illustrated tank 3 holds a supply of developing solution 4. Additional tanks would hold fixing, washing and other solutions. A dryer (not shown) may be included after the tanks for hot air drying a solution-treated web.

A hinged door 5, forming part of the housing 2, is opened to place a supply roll 6 of a photosensitive web 7 in the processor 1. The conveyor for transporting the web 7 from its supply roll 6, through the various web treating sections of the processor 1, is a flexible endless element. This transport element is shown in FIG. 1 as a flat endless belt or band 8 trained over a plurality of guide rollers 9. The guide rollers 9 are mounted for counterclockwise rotation, as viewed in FIG. 1, on respective shafts 10 which may be journaled in a frame support (not shown). Suitable drive means including a motor (not shown) is provided for rotating the guide rollers 9. The guide rollers 9 define a portion of a sinuous endless path along which the transport belt 8 is longitudinally moved in the general direction indicated by the arrows in FIG. 1. The illustrated portion of the endless path extends alongside the web supply roll 6, and into and out of the tank 3, to enable the transport belt 8 to pull the web 7 off its supply roll and through the developing solution 4. Additional guide rollers (not shown) are provided to guide the belt 8 along further portions of the endless path which extend through the remaining web treating sections of the processor 1.

Figure 3:
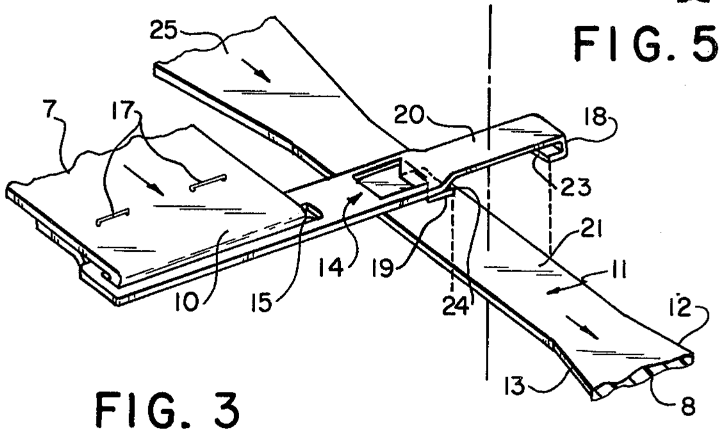
FIG. 3 is an enlarged perspective view of the coupling bar and the moving belt, illustrating the bar about to be placed on the belt.

The transport belt 8 preferably consists of a synthetic plastic material which is capable of resisting the chemical action of the web-treating solutions. As illustrated in FIG. 3, the transport belt 8 includes a plurality of reduced width or narrow sections 11 (only one shown) disposed in evenly spaced relation along the entire belt. According to the preferred embodiment, the reduced width section 11 has a nonuniform or varied width. That is, when looking generally from right to left in FIG. 3, it can be seen that, at the reduced width section 11, the longitudinal edges 12 and 13 of the belt 8 first incline towards each other, then extend in parallel relation, and finally incline away from each other. In all instances, however, the width of the reduced section 11 is less than the width of the remainder of the belt 8. The reason for this configuration will become apparent from the description of operation which follows.

Figure 2:
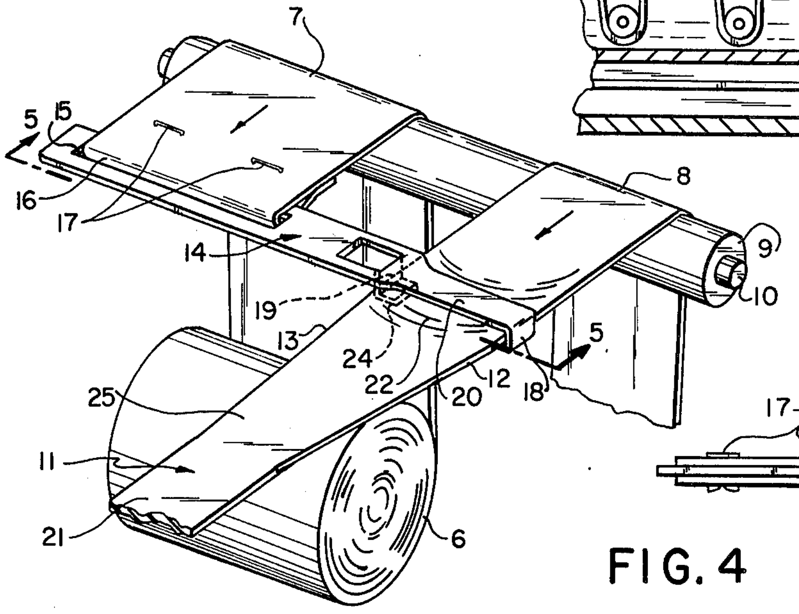
FIG. 2 is an enlarged perspective view of the web transporting apparatus, illustrating a coupling bar attached to a moving belt for transporting the photosensitive web.
Figure 4:
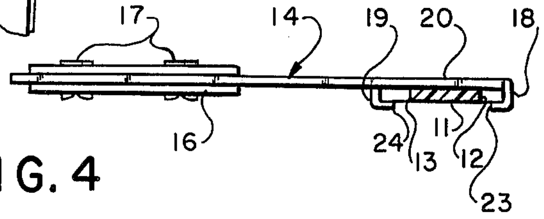
FIG. 4 is a vertical sectional view of the coupling bar and the moving belt, illustrating their relative positions after the bar is placed on the belt, but previous to their engagement.

Connection of the web 7 and the transport belt 8, to draw the web from one end of the processor 1 to the other, is accomplished with a coupling bar 14. The details of the coupling bar are shown in FIGS. 2 and 3. As illustrated, the coupling bar 14 includes an elongate slot 15 adjacent one end. A leading end portion 16 of the web 7 is passed through the slot 15, reversely looped around the coupling bar 14, and fastened to the web by two staples 17. Adjacent an opposite end of the coupling bar 14, there is included a pair of oppositely spaced belt-engaging or gripper members, shown as inwardly bent lugs 18 and 19 which project from a plate-like base member 20 of the coupling bar. The lugs 18 and 19 are spaced apart a distance slightly greater than the maximum width dimension of the reduced section 11 of the transport belt 8. Such distance is sufficient to easily allow an intermediate portion 21 of the reduced width section 11 to fit, as shown in FIGS. 3 and 4, between the two lugs 18 and 19 without transversely flexing or otherwise manipulating the reduced width section.

Figure 5:
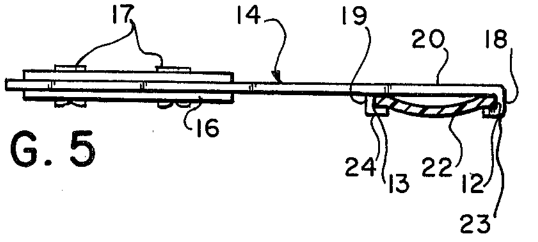
FIG. 5 is a vertical sectional view as seen in the direction of the arrows from the line 5—5 in FIG. 2, illustrating the coupling bar engaged with the moving bar.

Besides the distance between the lugs 18 and 19 being greater than the width of the reduced section 11, the distance is slightly less than the width of the remainder of the transport belt 8. This enables the lugs 18 and 19 to engage or grip the longitudinal edges 12 and 13 of the belt 8 as shown in FIGS. 2 and 5. In operation, the transport belt 8 is moved along its endless path in the general direction indicated by the arrows in FIG. 3. While the belt 8 is moving, an operator holds the base member 20 of the coupling bar 14 against the intermediate portion 21 of the reduced width section 11. In this position, shown in FIG. 4, the parallel edges 12 and 13 of the intermediate portion 21 are located between and spaced from the lugs 18 and 19. After the reduced width section 11 is advanced from between the lugs 18 and 19 in the indicated direction, a belt section 22 which follows or trails the reduced section (and is wider than it) will be moved into edgewise engagement with the lugs as shown in FIGS. 2 and 5. In this way, the coupling bar 14 is attached to the moving belt 8. Then the web 7, which is secured to the coupling bar 14, will be drawn forward by the moving belt 8 as shown in FIG. 1. At an exit end of the processor 1, the coupling bar 14 is removed from the transport belt 8 and the leading portion 16 of the web 7 is wound onto a take-up spool (not shown). Removal of the coupling bar 14 from the moving belt 8 can be accomplished in a known manner, such as by slipping a suitable wedge-shaped device between the engaged belt section 22 and the coupling bar to separate the two. Alternatively, in accordance with the invention, the coupling bar 14 can be held stationary with respect to the moving belt 8 until the next reduced width section 11 is advanced between the lugs 18 and 19. Then the coupling bar (which is now disengaged from the moving belt) is lifted from the reduced width section.

Referring again to FIG. 5, as the lugs 18 and 19 of the coupling bar 14 are spaced apart a distance slightly less than the width of the wider belt section 22 which follows the reduced width section 11, the wider belt section will be transversely flexed by engagement of its longitudinal edges 12 and 13 with the lugs. Free end portions 23 and 24 of the lugs 18 and 19 extend toward each other to grip the transport belt 8 partially across its width during engagement of the wider belt section 22 by the lugs. This, of course, further assures that the belt 8 will be frictionally held by the lugs 18 and 19 as the belt draws the web 7 from one end of the processor 1 to the other. As shown in FIG. 3, the reduced width section 11 may include a transition portion 25 adjoining its intermediate parallel-edge portion 21. This transition portion 25 is tapered in the general direction the belt 8 is moving to enable its longitudinal edges 12 and 13 to guide the lugs 18 and 19 into engagement with the longitudinal edges of the wider belt section 22. Alternatively, of course, the reduced width section 11 could be tapered in its entirety or have some other configuration such as parallel edges.

The present invention has been described in detail with particular reference to a preferred embodiment thereof; however, it should be understood that variations and modifications can be effected within the spirit and scope of the invention.

I claim:

1. Web transporting apparatus comprising:

an endless transport element having at least one reduced width section;

means for longitudinally moving said transport element; and means for connecting a leading portion of a web and said transport element for moving the web with said transport element, said connecting means including gripper members spaced apart a distance greater than the width of said reduced width section of said transport element to allow said reduced width section to be received between said gripper members, but said distance being sufficiently less than the width of another section of said transport element following said reduced width section to cause said following section to be engaged by said gripper members after said reduced width section is longitudinally moved from between them.

2. Web transporting apparatus comprising:

an endless belt having a pair of longitudinal edges and at least one reduced width section;

means for longitudinally moving said belt; and means for connecting a leading portion of a web and said belt to draw the web as said belt is moved, said connecting means including a pair of gripper members spaced opposite each other a distance greater than the width of said reduced width section of said belt to allow said reduced width section to be received between said gripper members, but said distance being slightly less than the width of a belt section following said reduced width section to cause the longitudinal edges of said following section to be engaged by said gripper members after said reduced width section is longitudinally moved from between them.

3. Web transporting apparatus as recited in claim 2, wherein said reduced width section of said belt is tapered in a manner such that its longitudinal edges are inclined toward each other in the direction said belt is moved to enable said longitudinal edges to guide said gripper members into respective engagement with the longitudinal edges of a belt section which follows said reduced width section.

4. Web transporting apparatus as recited in claim 2, wherein said reduced width sectin of said belt is tapered in a manner such that its longitudinal edges are inclined toward each other in the direction said belt is moved to enable said longitudinal edges to guide said gripper members into respective engagement with the longitudinal edges of a belt section which follows said reduced width section, and wherein said belt is flexible across its width to allow said following section to be transversely flexed during engagement of its longitudinal edges by said gripper members.

5. Web transporting apparatus as recited in claim 2, wherein said belt has a plurality of reduced width sections disposed in spaced relation along said belt to enable said gripper members to engage said belt at a number of locations.

6. Web transporting apparatus comprising:

a transversely flexible endless belt having a pair of longitudinal edges and at least one reduced width section which is tapered to gradually reduce its width from that of said belt;

means for longitudinally moving said belt; and a coupling bar having means for holding a leading portion of a web and for engaging said belt to couple the two and draw the web as said belt is moved, said engaging means including a pair of gripper members spaced opposite each other a distance greater than the width of said reduced width section of said belt to allow said reduced width section to be received between said gripper members, but said distance being slightly less than the width of a belt section following said reduced width section to cause the longitudinal edges of said following section to be respectively engaged by said gripper members after said reduced width section is longitudinally moved from between them.

7. Web transporting apparatus as recited in claim 6, wherein said gripper members are lugs having respective free end portions which extend toward each other to hold said belt partially across its width during engagement by said lugs, said free end portions being spaced apart a distance greater than the width of said reduced width section of said belt but less than the width of a belt section which follows said reduced width section.

8. A web transport belt which is adapted for use with a coupling bar for coupling a leading portion of a web to said transport belt for movement therewith, the coupling bar being of the type having a pair of oppositely spaced gripper members for engaging said transport belt at respective portions of its longitudinal edges, said transport belt comprising:

a plurality of reduced width sections disposed in spaced relation along said belt, and being sufficiently reduced in width from remaining wider sections of said belt to enable said reduced width sections to be individually received between the gripper members of a coupling bar without the gripper members engaging said reduced width sections at respective portions of its longitudinal edges, said reduced width sections each having a longitudinally tapering portion which is tapered to enable its longitudinal edges to guide the gripper members of a coupling bar into engagement with respective portions of the longitudinal edges of a wider belt section.

9. A web transport belt as recited in claim 8, wherein said reduced width sections each further have a substantially parallel-edge portion which is narrower across its width than said tapering portions.

* * * * *